United States Patent
Kim (10) Patent No.: US 10,594,932 B2
(45) Date of Patent: Mar. 17, 2020

(54) CAMERA MODULE PERFORMING A RESOLUTION CORRECTION AND ELECTRONIC DEVICE INCLUDING THE SAME

(71) Applicant: SAMSUNG ELECTRO-MECHANICS CO., LTD., Suwon-si (KR)

(72) Inventor: Hyun Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 105 days.

(21) Appl. No.: 15/712,855

(22) Filed: Sep. 22, 2017

(65) Prior Publication Data

US 2018/0115704 A1 Apr. 26, 2018

(30) Foreign Application Priority Data

Oct. 21, 2016 (KR) ........................ 10-2016-0137730

(51) Int. Cl.
| H04N 5/232 | (2006.01) |
|---|---|
| H04N 5/225 | (2006.01) |
| H04N 5/357 | (2011.01) |
| G02B 7/36 | (2006.01) |
| G06T 3/40 | (2006.01) |

(Continued)

(52) U.S. Cl.
CPC ........... *H04N 5/23232* (2013.01); *G02B 7/36* (2013.01); *G06T 3/4053* (2013.01); *G06T 5/003* (2013.01); *H04N 5/2253* (2013.01); *H04N 5/2254* (2013.01); *H04N 5/23229* (2013.01); *H04N 5/3572* (2013.01); *G02B 7/08* (2013.01); *G02B 13/02* (2013.01)

(58) Field of Classification Search
CPC ............. H04N 5/23232; H04N 5/3572; H04N 5/23229; H04N 5/2253; H04N 5/2254; G02B 7/36; G02B 7/08; G02B 13/02; G06T 5/003; G06T 3/4053
See application file for complete search history.

(56) References Cited

U.S. PATENT DOCUMENTS

2010/0188528 A1 7/2010 Iwata et al.
2010/0328437 A1 12/2010 Lee (Continued)

FOREIGN PATENT DOCUMENTS

| CN | 103856723 A | 6/2014 |
|---|---|---|
| CN | 104767930 A | 7/2015 |

(Continued)

OTHER PUBLICATIONS

Chinese Office Action dated Sep. 5, 2019 in Corresponding Chinese Patent Application No. 201710990893.2 (12 pages in English, 10 pages in Chinese).

*Primary Examiner* — Hung H Lam
(74) *Attorney, Agent, or Firm* — NSIP Law (57) ABSTRACT

A camera module includes a lens module comprising a lens; an image sensor disposed below the lens module and configured to generate an image of a subject from light passing through the lens; and a logic controller configured to perform a resolution correction calculation on the image generated using aberration information estimated by comparing the image generated with a pre-constructed clear image of the subject with each other.

10 Claims, 9 Drawing Sheets

(51) Int. Cl.
   *G06T 5/00*   (2006.01)
   *G02B 7/08*   (2006.01)
   *G02B 13/02*   (2006.01)

(56) References Cited

U.S. PATENT DOCUMENTS

| | | | |
|---|---|---|---|
| 2013/0242138 A1* | 9/2013 | Becker-Lakus | H04N 5/23232 348/239 |
| 2014/0002688 A1* | 1/2014 | Inoue | H04N 5/23296 348/222.1 |
| 2014/0160005 A1 | 6/2014 | Lee et al. | |
| 2014/0376795 A1* | 12/2014 | Lamash | G06T 3/4053 382/131 |
| 2015/0195461 A1 | 7/2015 | Kang et al. | |
| 2016/0093023 A1 | 3/2016 | Prasad et al. | |
| 2017/0054910 A1* | 2/2017 | Moriuchi | H04N 5/23267 |
| 2017/0104897 A1 | 4/2017 | Kang et al. | |
| 2017/0104926 A1* | 4/2017 | Kim | H04N 5/23235 |
| 2017/0191945 A1* | 7/2017 | Zhang | G01N 21/8851 |

FOREIGN PATENT DOCUMENTS

| | | |
|---|---|---|
| CN | 106572285 A | 4/2017 |
| EP | 2 390 720 A2 | 11/2011 |
| JP | 2013-175003 A | 9/2013 |
| JP | 2015-33006 A | 2/2015 |
| JP | 2016-82524 A | 5/2016 |
| KR | 10-2010-0138453 A | 12/2010 |
| KR | 10-2014-0076413 A | 6/2014 |
| KR | 10-2016-0037115 A | 4/2016 |

* cited by examiner

CAMERA MODULE PERFORMING A RESOLUTION CORRECTION AND ELECTRONIC DEVICE INCLUDING THE SAME

CROSS-REFERENCE TO RELATED APPLICATION(S)

This application claims the benefit under 35 USC 119(a) of Korean Patent Application No. 10-2016-0137730 filed on Oct. 21, 2016 in the Korean Intellectual Property Office, the entire disclosure of which is incorporated herein by reference for all purposes.

BACKGROUND

1. Field

The present disclosure relates to a camera module and an electronic device including the same.

2. Description of Related Art

Recently, the numbers and sizes of pixels of displays used in mobile devices such as cellular phones, tablet personal computers (PCs), and the like, have rapidly increased. The numbers of pixels in camera modules used in the mobile devices have also increased, in accordance with the increment in the numbers of pixels of displays.

In spite of a trend in the development of camera modules of mobile devices, the sizes of pixels of image sensors have reduced in accordance with miniaturization and slimming of mobile devices. As a result of the reduced sizes of pixels, phenomena such as insufficiency of brightness at low illumination, large amounts of noise, and insufficiency of gray scale expression in a back light situation occur. These phenomena further emerge in an optical zoom function.

In accordance with the slimming of mobile devices, generally, the heights of telephoto lenses are limited, such that magnifications of optical zooms of camera modules of the mobile devices are limited to about 2×. An attempt to solve the limitation in the height of the telephoto lens by curving a path of light incident to the telephoto lens using a prism mirror has been continuously conducted. However, in a telephoto lens having a curved form, the height of the camera module may be reduced to 6 mm or less, while a path of light may be increased to 20 mm or more, such that the length of the camera module is increased to a level of 25 mm, resulting in an increase in a volume of the camera module.

In addition, an attempt to implement a high image-quality optical zoom function by synthesizing an image of a wide-angle camera including a wide-angle lens and an image of a telephoto camera with each other has also been continuously conducted. When the image of the wide-angle camera and the image of the telephoto camera are synthesized with each other, it is necessary that relative image alignment values and distortion amount information existing between images of the wide-angle camera and the telephoto camera be recorded in the camera modules, but the image alignment values and the distortion amount information recorded in a manufacturing process may not reflect a change in a tile and a change in a focal length generated in an actual use environment of the camera modules.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens module comprising a telephoto lens; an image sensor disposed below the lens module and configured to generate an image of a subject from light passing through the telephoto lens; and a logic controller configured to perform a resolution correction calculation on the image generated using aberration information estimated by comparing the image generated with a pre-constructed clear image of the subject with each other.

The aberration information may include a point spread function modeled by Blur_Image=PSF*Clear_Image, where Blur_Image is the image generated by the image sensor, PSF is the point spread function, Clear_Image is the pre-constructed clear image of the subject, and * is a convolution.

The aberration information may include a blur parameter including a coordinate position of a peak and a width of blur extracted from the point spread function.

The aberration information may include point spread functions of error regions in which differences between the point spread functions and a reference point spread function are equal or greater than a threshold value among regions of the image; and blur parameters of normal regions in which differences between point spread functions and the reference point spread function are lower than the threshold value among the regions of the image, in a comparison of point spread functions of each of the regions and the reference point spread function.

The reference point spread function may be based on design data of the camera module.

The camera module may further include a memory configured to store the point spread functions of the error regions and the blur parameters of the normal regions therein.

Respective data sizes of the point spread functions of the error regions and the blur parameters of the normal regions may be different from each other.

The memory may be a non-volatile memory.

The logic controller may perform the resolution correction calculation on the image generated by the image sensor depending on either one or both of an illumination environment at the time of capturing an image of the subject and a focus position.

The aberration information may include a deblur parameter including information on a number and sizes of the regions.

The telephoto lens may be curved.

In another general aspect, an electronic device includes a lens module comprising a telephoto lens; an image sensor disposed below the lens module and configured to generate an image of a subject from light passing through the telephoto lens; a host module magnifying the image generated by the image sensor depending on a set optical zoom magnification to generate a zoom image, wherein the host module receives images transferred from the image sensor, crops zoom regions in each of the images, and then synthesizes the images in which the zoom regions are cropped with one another to generate zoom images.

The host module may synthesize the images in which the zoom regions are cropped with one another at a super resolution.

The host module may include a buffer module configured to sequentially store the images from transferred from the image sensor therein; and a signal processor configured to:

crop the zoom regions in each of the images stored in the buffer module, and synthesize the images in which the zoom regions are cropped with one another.

The telephoto lens may be curved.

The super resolution synthesis generates four-fold zoom images.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1:
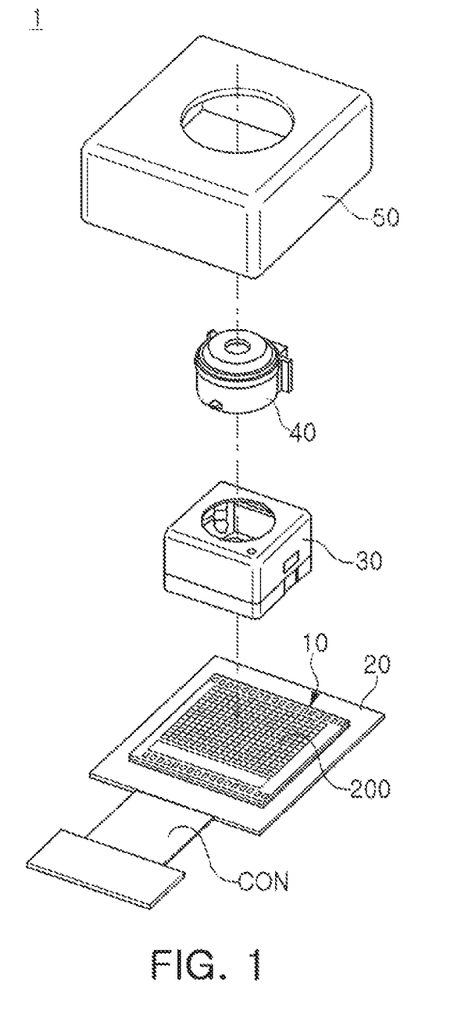
FIG. 1 is a schematic exploded perspective view illustrating an example of a camera module.

FIG. 1 is a schematic of an exploded perspective view illustrating an example of a camera module in the present disclosure.

Referring to FIG. 1, the camera module includes an image sensor 10, a printed circuit board 20, an actuator holder 30, a lens module 40, and a case 50.

The image sensor 10 is mounted on the printed circuit board 20. A connector unit CON, electrically connecting to a host (not illustrated), is provided at a side of the printed circuit board 20. The actuator holder 30 accommodates the lens module 40 therein, and may apply a driving signal to a coil, disposed to face a magnet attached to one side of the lens module 40, to drive the lens module 40 in an optical axis direction. The lens module 40 may include a plurality of lenses. As an example, the plurality of lenses are telephoto lenses and/or curved telephoto lenses.

The actuator holder 30 coupled to the lens module 40 is mounted on a pixel array controller 200 of the image sensor 10. The actuator holder 30 may be coupled to the printed circuit board 20 using a thermal adhesive. The case 50 supports and fixes the actuator holder 30 therein, and may be formed of a metal having low thermal strain, as an example. Although not illustrated in detail in FIG. 1, the printed circuit board 20 may be provided with an auxiliary integrated circuit (IC) 70 processing images output from the image sensor 10, in addition to the image sensor 10.

Figure 2:
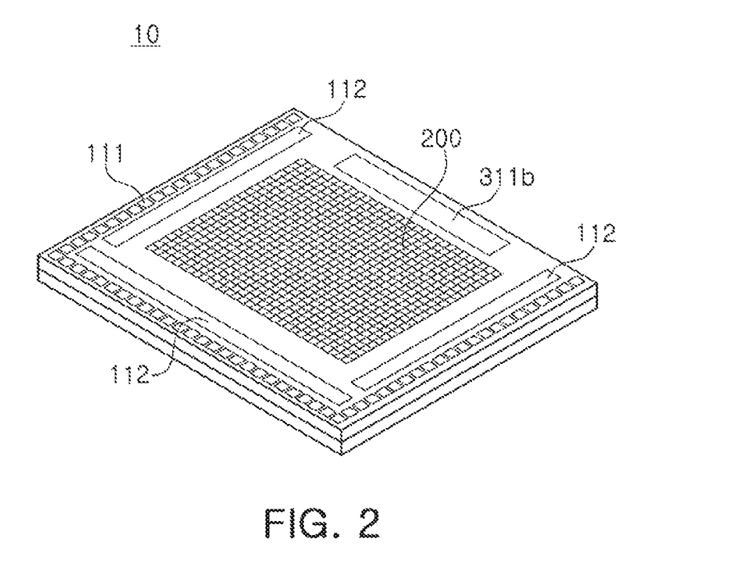
FIGS. 2 and 3 depict perspective views illustrating an upper surface and a lower surface of an example of an image sensor, respectively.
Figure 3:
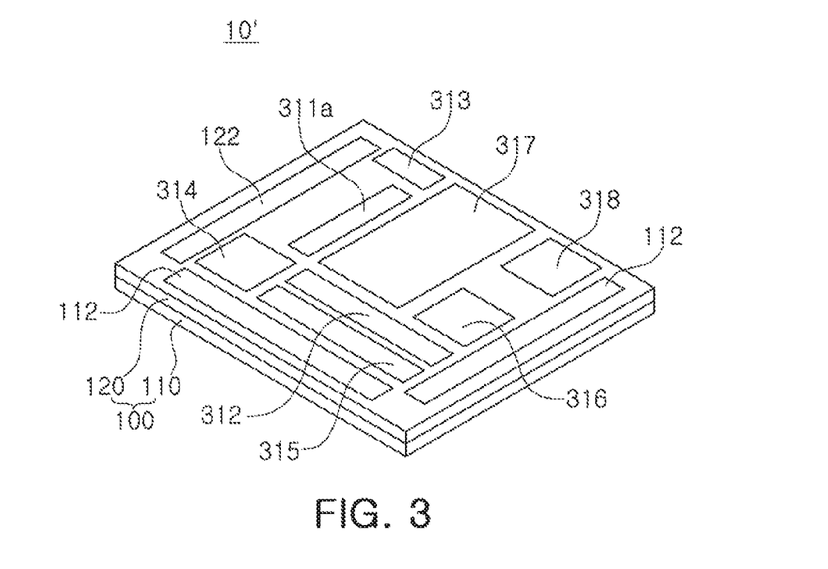

FIGS. 2 and 3 depict perspective views illustrating an upper surface and a lower surface of an example of an image sensor, respectively.

Referring to FIG. 2, an image sensor 10 includes a substrate 100, a pixel array controller 200, a pixel array driver 311, a sampling controller 312, a clock signal generator 313, a reference voltage generator 314, a digital converter 315, a memory unit 316, and a digital signal processor 317.

The substrate 100 may be a silicon substrate, and includes a first substrate 110 and a second substrate 120. The first substrate 110 and the second substrate 120 may be coupled to each other through a heat fusing process. The first substrate 110 and the second substrate 120 have a plurality of vias 112 formed therein, and the plurality of vias 112 penetrate through the first substrate 110 and the second substrate 120 and electrically connect the first substrate 110 and the second substrate 120 to each other. As an example, the plurality of vias 112 are through-silicon-vias (TSVs).

One of a plurality of pads 111, the pixel array controller 200, and one of a row driver 311a and a column driver 311b of the pixel array driver 311 are formed on the first substrate 110. A case in which the row driver 311a and the column driver 311b of the pixel array driver 311 are formed on the first substrate 110 is illustrated in FIG. 2. The pixel array driver 311, the sampling controller 312, the clock signal generator 313, the reference voltage generator 314, the digital converter 315, the memory unit 316, and the digital signal processor 317 are formed on the second substrate 120. A serial interface 318 electrically connected to a host to transmit and receive data and signals is additionally formed on the second substrate 120.

A plurality of pads 111 is provided in edge regions of the first substrate 110 and the second substrate 120, and supplies power applied from an external source to the image sensor 10. In the image sensor 10, according to the example in the present disclosure, components are divided and disposed on the first substrate 110 and the second substrate 120 to increase space efficiency.

The pixel array controller 200 includes a plurality of pixels disposed in X (here, X is a natural number of 2 or more) rows and Y (here, Y is a natural number of 2 or more) columns in a matrix form, and each of the plurality of pixels may be provided with a photodiode.

The pixel array controller 200, according to the example in the present disclosure, is a color pixel array. The color pixel array is an RGB-format color pixel array having a red, green, and blue form. In addition, the color pixel array may be one of an RGBW-format color pixel array having a red, green, blue, and white form and an RWB-format color pixel array having a red, white, and blue form. White pixels may be added to the color pixel array to improve sensitivity, resulting in compensating for brightness at a low illumination.

The color pixel array 200 may be a multilayer color pixel array in which two or more pixel array layers are stacked in a vertical direction. The multilayer color pixel array that is three-dimensionally disposed may reduce an image capturing region as compared to a general color pixel array that is two-dimensionally disposed to thus reduce a size and a height of the camera module.

The pixel array driver 311 includes the row driver 311a and the column driver 311b. The row driver 311a may select pixels disposed in a row direction, among the plurality of pixels disposed in the matrix form, in the pixel array controller 200 and drive the selected pixels disposed in the row direction. The column driver 311b may select pixels disposed in a column direction, among the plurality of pixels disposed in the matrix form, in the pixel array controller 200 and drive the selected pixels disposed in the column direction. The photodiodes of the pixels selected in the pixel array controller 200 by the row driver 311a and the column driver 311b may output analog signals such as voltage signals.

The sampling controller 312 samples the analog signals of the pixel array controller 200. The sampling controller 312 may include a correlated double sampling (CDS) circuit sampling the analog signals output from the photodiodes of the pixel array controller 200, and the CDS circuit may sample the analog signals to generate sampled signals. The sampling controller 312 may further include an amplifier circuit amplifying the analog signals of the photodiodes sampled by the CDS circuit.

The clock signal generator 313 provides clock signals to the pixel array driver 311, the sampling controller 312, and the like. The clock signal generator 313 may include a phase locked loop (PLL) circuit generating internal clock signals from clock signals input from an external source and a timing generator (T/G) circuit controlling exposure timing, reset timing, reading timing, frame outputting timing of the photodiodes of the plurality of pixels of the pixel array controller 200. The pixel array driver 311 and the sampling controller 312 may perform driving and sampling operations of the pixel array controller 200, respectively, using the clock signals provided from the clock signal generator 313.

The reference voltage generator 314 generates a reference voltage supplied to the pixel array driver 311, the sampling controller 312, and the like. As an example, the reference voltage generator 314 generates the reference voltage through power applied from an external source through the pads 111.

The digital converter 315 includes an analog-to-digital converter, and converts the sampled signal output from the sampling controller 312 into digital signals to generate images. A reference image and a relative image generated by the digital converter 315 may be provided to the digital signal processor 317.

The memory unit 316 may include a read only memory (ROM) including firmware, a random access memory (RAM) required for image processing calculation, a one-time programmable (OTP) memory recording calibration information, and a register.

The digital signal processor 317 performs image-processing on the images including the digital signals provided from the digital converter 315.

Generally, a camera module includes an optical system including at least one lens. A difference exists between an image obtained by the camera module and an actual image. The reason is that a resolution of the camera module is affected by an aberration. The aberration refers a phenomenon in which an image is viewed in a blurred state, a state in which it has color, or a distorted state due to light not being collected at one point after passing through the optical system. There are monochromatic aberrations appearing when monochromatic light having a constant wavelength is used and a chromatic aberration appearing since refractive indices of the optical system are different from each other, depending on a wavelength of light.

Here, the monochromatic aberration may be understood to further include a tilt aberration, a defocus aberration, a spherical aberration, a coma aberration, an astigmatism, a bulge aberration, and a distortion. In the present specification, aberration is understood as including either one or both of the monochromatic aberration and the chromatic aberration. Generally, the aberration tends increase due to a requirement for a slim camera module used in portable electronic devices, and a blur phenomenon occurs due to the increased in the aberration, such that the resolution of A camera module is reduced.

The blur phenomenon is a phenomenon in which brightness of one pixel of a clear image distorts the brightness of surrounding pixels due to the aberration, and may be represented by a point spread function (PSF) indicating a level of blur. When the PSF has a relatively narrow distribution, the resolution is represented as being high. To the contrary, when the PSF has a relatively wide distribution, the resolution is presented as being low.

A blur image Blur_Image obtained at the time of capturing an image of a subject by the camera module is modeled by a convolution between a clear image Clear_Image, defining a nonblurred image, and the point spread function (PSF) as represented in Equation 1.

Blur_Image=PSF*Clear_Image(*: Convolution)　　　　[Equation 1]

Here, when the PSF is calculated, the clear image is reconstructed from the blur image through deconvolution, but it is very difficult to accurately calculate the PSF from the blur image. Therefore, in order to reconstruct the clear image, it is required to very precisely estimate the PSF and store the estimated PSF in each of the camera modules.

Figure 4:
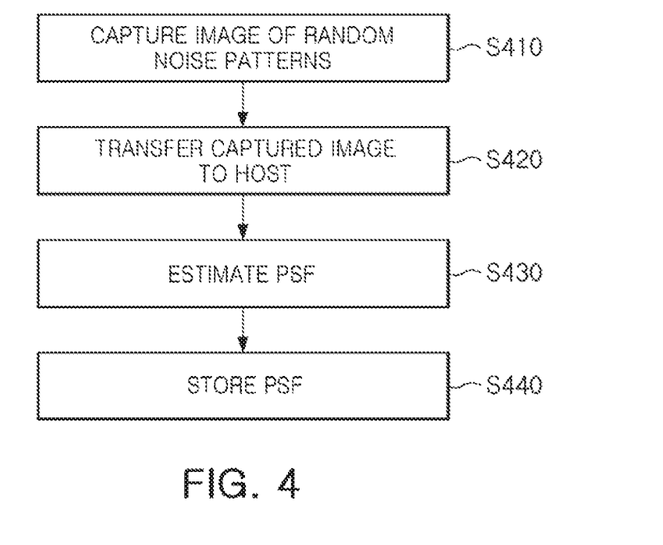
FIG. 4 is a flow chart illustrating an example of a method of estimating and storing a point spread function (PSF).
Figure 5:
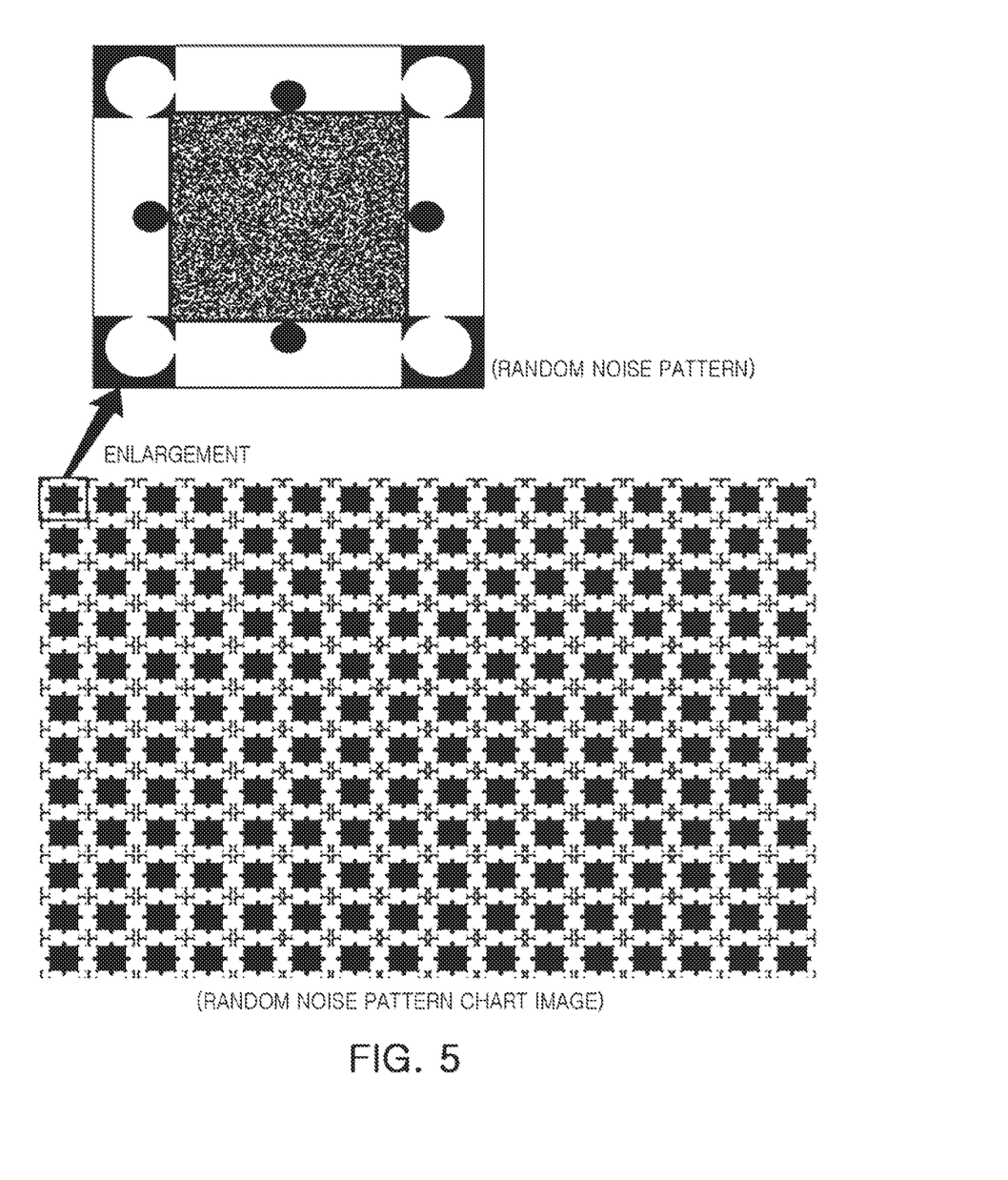
FIG. 5 is a view illustrating an example of random noise patterns.

FIG. 4 is a flow chart illustrating an example of a method of estimating and storing a PSF in the present disclosure, and FIG. 5 is a view illustrating an example of random noise patterns. Processes of storing the PSF in each of the camera modules during the manufacturing process of the camera modules will be described in detail with reference to FIGS. 4 and 5.

Referring to FIG. 4, the method of estimating and storing a PSF starts with capturing an image of the random noise patterns of FIG. 5 (S410). The camera module capture an image of the random noise patterns spaced apart from each other by a predetermined distance. The captured image is transferred to a host (S420), and the host estimates the PSF by comparing a clear image with the captured image of the random noise patterns with each other (S430). The estimated PSF is stored in the camera module (S440). In this case, since a difference is generated between PSFs of camera modules per manufactured camera module, the PSFs are estimated per individual module in a calibration process of the processes of manufacturing the camera modules, and are stored in the corresponding camera modules. The stored PSFs are used to reconstruct a clear image from a blurred image.

Through the processes described above, the camera module stores information on the estimated PSF, and corrects the resolution of the captured image using the stored information on the estimated PSF to implement high image-quality resolution.

The PSF may have a form similar to a Gaussian form in a central region of a pixel array of the image sensor, and have a form that becomes different from the Gaussian form toward a surrounding region of the pixel array. Therefore, in order to efficiently estimate the PSFs having different forms in each region, it is necessary to divide the pixel array of the image sensor into M equal parts in a horizontal direction and into N equal parts in a vertical direction and estimate the PSFs in each of a plurality of regions corresponding to a total of M×N regions.

According to the examples in the present disclosure, the captured image is partitioned into a plurality of regions, and the estimated PSFs of only regions in which large differences of a threshold value or more exist in a comparison of the PSFs estimated in each of the plurality of regions and a design value of the optical system are stored in a memory in the camera module. Regions in which differences are lower than a threshold value, that is, regions in which the difference are not high, are determined to have a good resolution, and the estimated PSFs of the corresponding regions are not stored as they are. But blur parameters indicating widths of blur and coordinate positions of peaks estimated by approximating the estimated PSFs of the corresponding regions by a Gaussian function are stored in the memory of the camera module.

Figure 6:
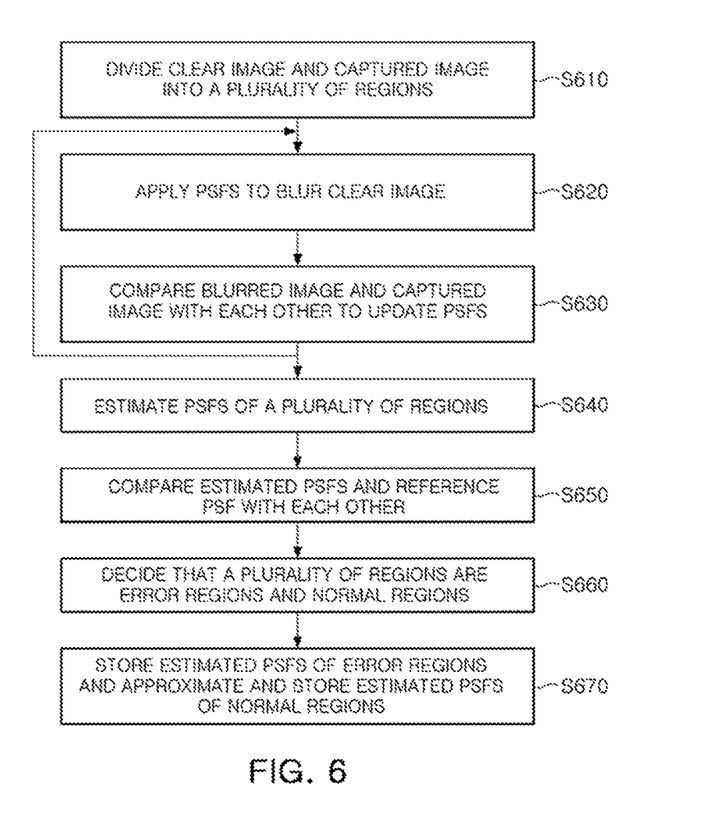
FIG. 6 is a flow chart illustrating an example of a process of generating aberration information.

FIG. 6 is a flow chart illustrating a process of generating aberration information according to an example in the present disclosure. A method of estimating aberration information on blur characteristics in each region of an image will be described in detail with reference to FIG. 6.

First, a clear image and a captured image of random noise patterns are divided into a plurality of regions (S610). Then, PSFs are applied to each of the plurality of regions of the clear image of the random noise patterns to blur the clear image of the random noise pattern (S620). The blurred image and the captured image are compared with each other to update the PSFs while changing the PSFs so that the image difference between the blurred image and the captured image is significantly reduced (S630). As a result of the update, the PSFs of each of the plurality of regions are estimated (S640), and the estimated PSFs of each of the plurality of regions may be different from each other.

When the PSFs of the plurality of regions are estimated, the estimated PSFs of each of the plurality of regions and a reference PSF are compared with each other (S650). Here, the reference PSF is a value indicating ideal simulation data in a process of designing an optical system. When differences between the estimated PSFs and the reference PSF are equal to a threshold value or more, corresponding regions are determined to be error regions (NG regions) in terms of a resolution of the camera module. When differences between the estimated PSFs and the reference PSF are lower than the threshold value, corresponding regions are determined to be normal regions (OK regions) in terms of the resolution of the camera module (S660).

Then, the estimated PSFs of the error regions are stored in the camera module, and the estimated PSFs of the normal regions are approximated and then stored in the camera module (S670). The estimated PSFs of the normal regions are not stored in the camera module as they are, but are approximated by a Gaussian function, such that blur parameters including widths of blur and coordinate positions of peaks are stored in the camera module.

The following Equation 2 represents a Gaussian approximation function used in a PSF approximation process performed with respect to the normal regions. The PSFs estimated in the previous process are subjected to a normalization process so that maximum values thereof become 255 (a maximum value in an 8-bit gray scale resolution), and be then approximated using the Gaussian approximation function as represented by the following Equation 2.

$$PSF_{gaussian}(x, y) = 255 * \exp\left(-\left[\left(\frac{x-a}{\sigma_x}\right)^2 + \left(\frac{y-b}{\sigma_y}\right)^2\right]\right)$$ [Equation 2]

Here, a and b indicate coordinate positions of peaks of the divided window regions in horizontal and vertical directions, respectively, and σx and σy indicate widths of blur of the divided window regions in the horizontal and vertical directions, respectively.

According to the example in the present disclosure, the estimated PSFs of the error regions are stored in the camera module as they are, but the estimated PSFs of the normal regions are approximated by the Gaussian function, such that the blur parameters including the widths of the blur and the coordinate positions of the peaks are stored in the camera module, resulting in a significant reduction in a size of stored data.

For example, in a case in which an image is divided into 16×12 regions, PSFs of the 16×12 regions are estimated, and all the estimated PSFs are then stored, required sizes of memories are as described in the following [Case 1] and [Case 2].

Here, in the case in which the entire image is divided into the 16×12 regions, the number of regions existing within 0.3 Field may correspond to 6×6=36, and the number of regions existing within 0.5 Field may correspond to 10×10=100.

Here, when an end point of a pixel array of an image sensor in a diagonal direction is 1.0 Field, a pixel array of an image sensor having an aspect ratio of 4:3 may be represented by 0.8 Field in a horizontal direction and 0.6 Field in a vertical direction.

[Case 1] In Case in which Required Number of Channels is Four (R, Gr, Gb, and B)

Required Number of Channels×Number of Regions×Size of PSF Data of Each Region×Resolution of PSF Data ① 0.0 to 0.3 Field: In a case in which a size of PSF data is 5×5 pixels=4×(6×6)×(5×5)×1 byte=3,600 bytes ② 0.3 to 0.5 Field: In a case in which a size of PSF data is 7×7 pixels=4×(10×10−6×6)×(7×7)×1 byte=12,544 bytes ③ 0.5 to 1.0 Field: In a case in which a size of PSF data is 9×9 pixels=4×(16×12−10×10)×(9×9)×1 byte=29,808 bytes That is, Total Required Size of Memory: 3,600+12,544+29,808=45,952 bytes=44.88 Kbytes

[Case 2] In Case in which Required Number of Channels is Three (R, G, and B)

(The same PSF is Applied to Gr and Gb Channel)

Required Number of Channels×Number of Regions×Size of PSF Data of Each Region×Resolution of PSF Data ① 0.0 to 0.3 Field: In a case in which a size of PSF data is 5×5 pixels=3×(6×6)×(5×5)×1 byte=2,700 bytes ② 0.3 to 0.5 Field: In a case in which a size of PSF data is 7×7 pixels=3×(10×10−6×6)×(7×7)×1 byte=9,408 bytes ③ 0.5 to 1.0 Field: In a case in which a size of PSF data is 9×9 pixels=3×(16×12−10×10)×(9×9)×1 byte=22,356 bytes That is, Total Required Size of Memory: 2,700+9,408+22,356=34,464 bytes=33.66 Kbytes On the other hand, in a case in which the estimated PSFs of error regions, for example, only upper five regions in which differences between a reference PSF and the estimated PSFs are the largest are stored as they are and blur parameters are stored using a curve fitting method of a Gaussian approximation function with respect to the remaining normal regions, required sizes of memories are as described in the following [Case 3] and [Case 4].

Here, it is assumed that the error regions are generated in regions of 0.5 Field or more and four blur parameters default-set in each region in a hardware block internal correction algorithm performing correction calculation are used with respect to regions within 0.5 Field. It is assumed that the respective blur parameters are represented by 1 byte.

[Case 3] In Case in which Required Number of Channels is Four (R, Gr, Gb, and B)

① Required Number of Channels×Number of Error Regions (NG Regions)×Size of PSF Data of Each Region×Resolution of PSF Data=4×(5)×(9×9)×1 byte=1,620 bytes ② Required Number of Channels×Number of Normal Regions (OK Regions)×Blur Parameter of Each Region=4×(16×12−10×10)×4 bytes=1,472 bytes That is, Total Required Size of Memory: 1,620+1,472=3,092 bytes=3.02 Kbytes

[Case 4] In Case in which Required Number of Channels is Three (R, G, and B)

(The same PSF is Applied to Gr and Gb Channel)

① Required Number of Channels×Number of Error Regions (NG Regions)×Size of PSF Data of Each Region×Resolution of PSF Data=3×(5)×(9×9)×1 byte=1,215 bytes ② Required Number of Channels×Number of Normal Regions (OK Regions)×Blur Parameter of Each Region=3×(16×12−10×10)×4 bytes=1,104 bytes That is, Total Required Size of Memory: 1,215+1,104=2,319 bytes=2.26 Kbytes According to the example in the present disclosure, the blur parameters and the PSFs are stored, respectively, depending on which regions of the plurality of regions are determined to be the normal regions and which regions of the plurality of regions are determined to be the error regions, thus, reducing the size of the memory required for storing the blur parameters and the PSFs. Therefore, the blur parameters and the PSFs may be stored in a non-volatile memory region such as an OTP memory, a ROM, an electrically erasable programmable read only memory (EEPROM), or an FROM of the camera module 1.

Coordinates of regions corresponding to the blur parameters and the PSFs may also be stored in the memory. As an example, when it is determined that a region (16,1) of a total of 16×12 regions is an error region, a coordinate of (16,1) is stored together with the PSF in the memory.

In addition, the memory stores deblur parameters including information on the number and sizes of regions divided from the image as well as the PSF of the error regions and the blur parameters of the normal regions therein. As an example, when the image is divided into M×N regions, the deblur parameters include information on the number and sizes of regions divided in the horizontal direction and the number and sizes of regions divided in the vertical direction.

As described above, the PSFs, the blur parameters, and the deblur parameters stored in the memory correspond to the aberration information of the camera module. The aberration information may be stored in look-up table form.

Meanwhile, the resolution of the camera module may be affected by an illumination environment when the camera module captures the image of the subject and a determined focus adjusting position. Therefore, the camera module according to the example in the present disclosure adjusts deblurring intensities or denoising intensities in order to correct the resolution depending on the illumination environment when it captures the image of the subject and the determined focus adjusting position. The deblurring intensity or the denoising intensity is adjusted to determine an improvement level of the resolution of the captured image.

In detail, the host may perform an auto exposure (AE) control, an auto white balance (AWB) control, and an auto focus (AF) control of the camera module. The host may include the respective engines for performing the auto exposure (AE) control, the auto white balance (AWB) control, and the auto focus (AF) control.

An illumination at the time of capturing the image may be determined when the host performs the auto exposure (AE) control, a color temperature of a light source may be determined when the host performs the auto white balance (AWB) control, and a focus position of the optical system may be determined when the host performs the auto focus (AF) control. Information on the determined illumination, the determined color temperature of the light source, and the determined focus position may be stored in the camera module.

The camera module according to the example in the present disclosure may determine an appropriate deblurring intensity and denoising intensity depending on the stored information on the illumination, the color temperature of the light source, and the focus position and additionally perform resolution correction calculation. As an example, in a low illumination environment, the deblurring intensity is set to be weak and the denoising intensity is set to be strong, so as to generate low noise. In addition, when a focus position of the optical system is close to a close-up position, the deblurring intensity is set to be weak. When the light source is a halogen lamp (3000K), the influence of light having a red wavelength is large, and the deblurring intensity of a red channel is set to be stronger than those of a green channel and a blue channel.

The deblurring intensity and the denoising intensity may be prepared in a look-up table form determined through an experiment that changes the illumination environment and the distance between the camera module and the subject in a process of manufacturing the camera module. As an example, the deblurring intensity is divided into ten steps from Step 1 to Step 10 and then applied. Step 1 corresponds to the weakest deblurring intensity, and Step 10 corresponds to the strongest deblurring intensity. Similarly, the denoising intensity is also be divided into ten steps from Step 1 to Step 10 and then applied. Since the number of divided steps is appropriately determined based on experiment, the number of divided steps may be more or less than the ten steps.

Figure 7:
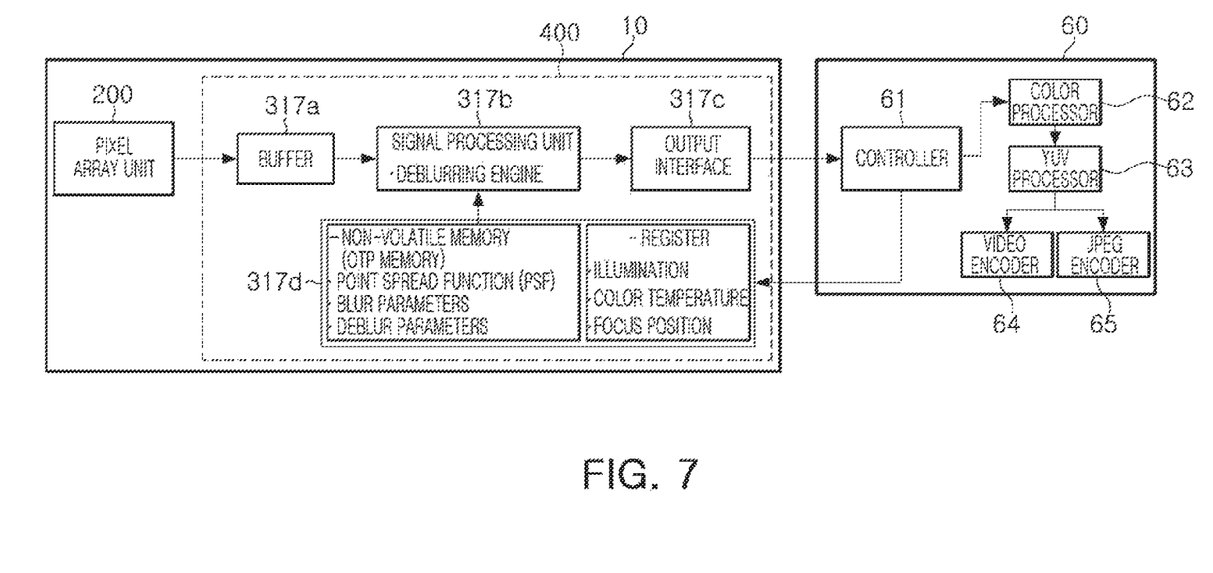
FIGS. 7 through 9 are block diagrams illustrating examples of main units of electronic devices according to various examples in the present disclosure.
Figure 8:
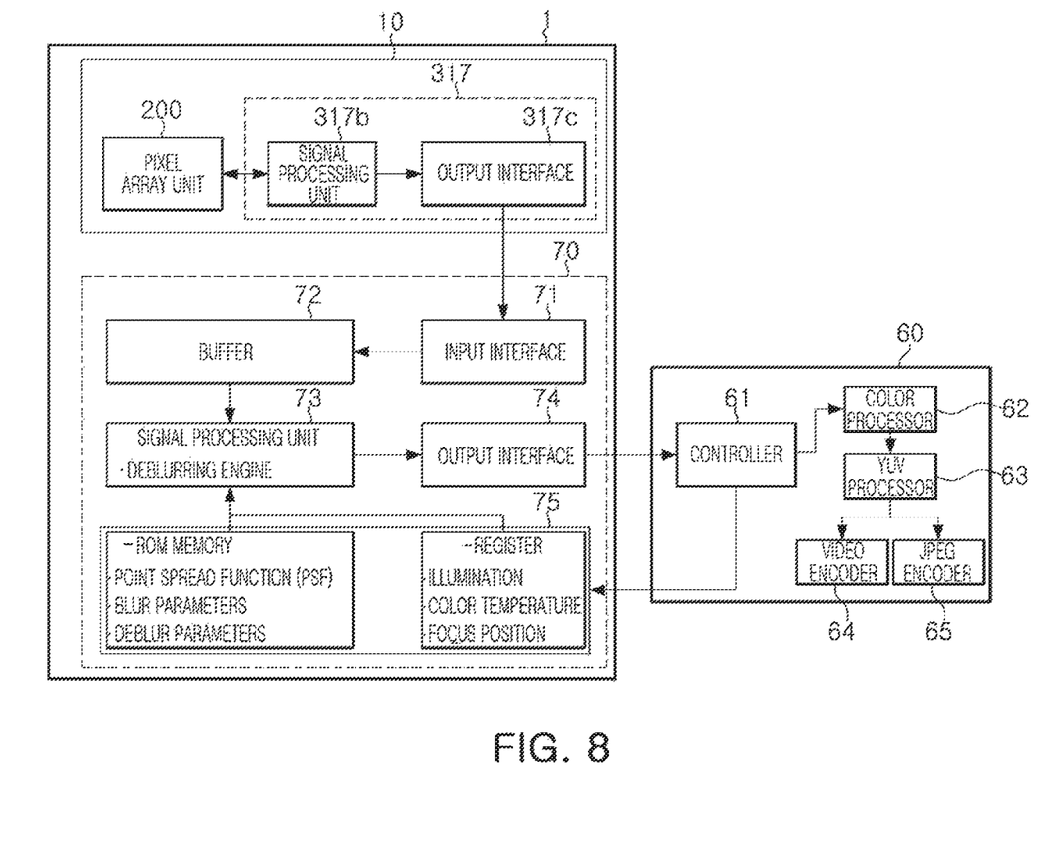
Figure 9:
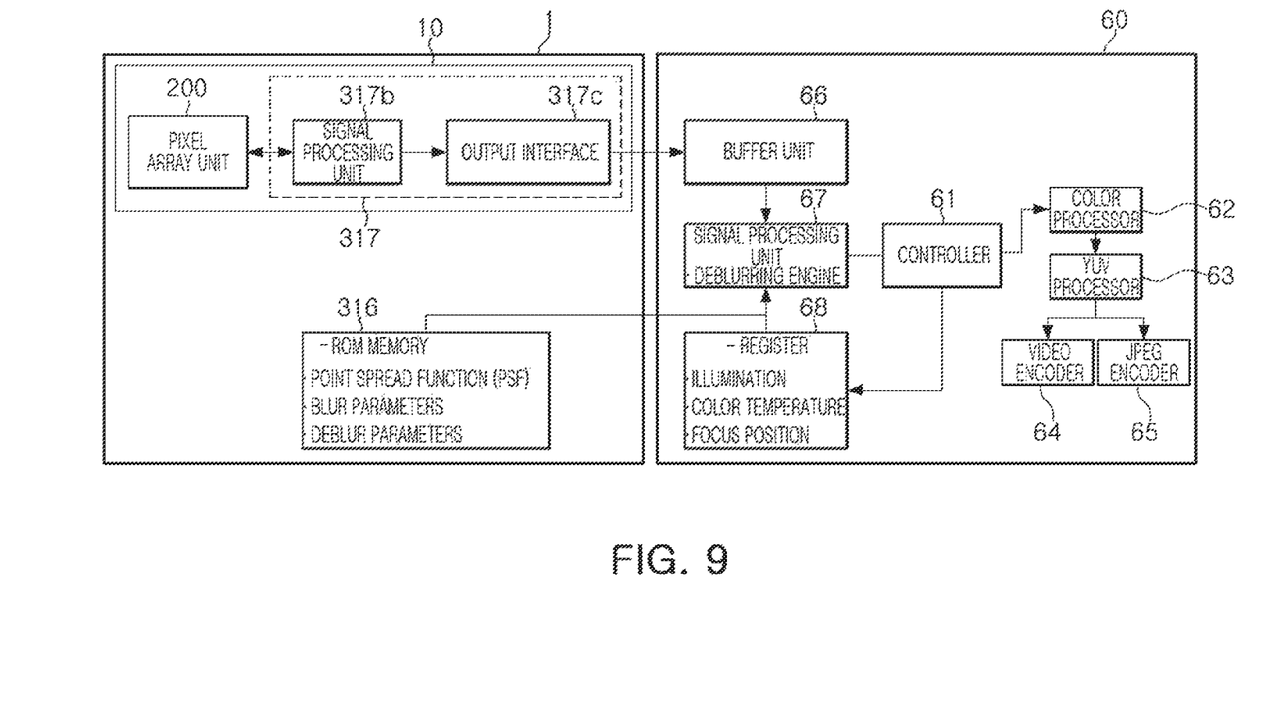

FIGS. 7 through 9 are block diagrams illustrating main units of electronic devices according to examples in the present disclosure. Since detailed operations of components of the examples of FIGS. 7 through 9 are similar to one another, except for partial differences in the configuration of a logic controller in which resolution correction calculation is performed and a configuration of a memory in which a plurality of parameters used in the resolution correction calculation are stored, overlapping or repeated descriptions will be omitted, and a camera module according to an example of FIG. 7 will be mainly described.

Referring to FIG. 7, a digital signal processor 317 includes a buffer module 317a, a signal processor 317b, and an output interface 317c, and may further include an auxiliary memory unit 317d.

The buffer module 317a receives the images provided from the pixel array controller 200. As described above, the images include the digital signals converted from the analog signals output from the pixel array controller 200 by the digital converter 315. The buffer module 317a includes a line buffer memory, and may sequentially store the received images therein.

When a reference number of images are stored in the line buffer memory of the buffer module 317a, the signal processor 317b drives a deblurring engine included in the signal processor 317b to perform resolution correction calculation of the images.

The aberration information including the PSFs, the blur parameters, and the deblur parameters are stored in the auxiliary memory unit 317d. As an example, the aberration information are stored in a non-volatile memory such as an OTP memory of the auxiliary memory unit 317d. The signal processor 317 performs the resolution correction calculation of the images using the aberration information stored in the auxiliary memory unit 317d. The deblurring engine included in the signal processor 317b may sample the PSFs stored in the auxiliary memory unit 317d by a required sampling rate to perform the resolution correction calculation in a video mode.

The images of which the resolutions are corrected are transferred to a host 60 of the electronic device in which the camera module is mounted, through the output interface 317c. The host 60 includes a controller 61 controlling the camera module, a color processor 62 processing the images of the resolutions being corrected, a YUV processor 63, a video encoder 64, and a joint photographic expert group (JPEG) encoder 65.

The controller 61 of the host 60 performs the auto exposure (AE) control, the auto white balance (AWB) control, and the auto focus (AF) control of the camera module. The controller 61 includes the respective engines for performing the auto exposure (AE) control, the auto white balance (AWB) control, and the auto focus (AF) control. The information on the illumination, the color temperature of the light source, and the focus position determined when the controller 61 performs the auto exposure (AE) control, the auto white balance (AWB) control, and the auto focus (AF) control is stored in a register in the auxiliary memory unit 317d. The signal processor 317b determines the appropriate deblurring intensity and denoising intensity depending on the information on the illumination, the color temperature of the light source, and the focus position stored in the register of the auxiliary memory unit 317d and additionally performs the resolution correction calculation of the images. When the information on the illumination, the color temperature of the light source, and the focus position is stored in the register, the signal processor 317b selects the deblurring intensity and the denoising intensity with reference to a look-up table to perform the resolution correction calculation of the images.

Referring to FIG. 8, a camera module according to an example in the present disclosure includes an image sensor 10, a host 60, and an auxiliary IC 70.

A digital signal processor 317 of the image sensor 10 includes a signal processor 317b and an output interface 317c. The signal processor 317b receives the images provided from the pixel array controller 200, change formats of the images into formats in which the images are transmitted to the auxiliary IC 70, and transfer the images having the changed formats to the auxiliary IC 70 through the output interface 317c. The images includes the digital signals converted from the analog signals output from the pixel array controller 200 by the digital converter 315.

The auxiliary IC 70 includes an input interface 71, a buffer module 72, a signal processor 73, and an output interface 74, and may further include an auxiliary memory unit 75.

The buffer module 72 receives the images transferred from the output interface 317c of the digital signal processor 317 through the input interface 71. The buffer module 72 includes a line buffer memory, and sequentially stores the received images therein.

When a reference number of images are stored in the line buffer memory of the buffer module 72, the signal processor 73 drives a deblurring engine included in the signal processor 73 to perform resolution correction calculation of the images.

The aberration information including the PSFs, the blur parameters, and the deblur parameters are stored in the auxiliary memory unit 75. As an example, the aberration information are stored in a non-volatile memory such as a ROM of the auxiliary memory unit 75. The signal processor 73 performs the resolution correction calculation of the images using the aberration information stored in the auxiliary memory unit 75. The deblurring engine included in the signal processor 73 may sample the PSFs stored in the auxiliary memory unit 75 by a required sampling rate to perform the resolution correction calculation in a video mode.

The images of which the resolutions are corrected are transferred to a host 60 of the electronic device in which the camera module is mounted, through the output interface 74. The host 60 includes a controller 61 controlling the camera module, a color processor 62 processing the images of the resolutions are corrected, a YUV processor 63, a video encoder 64, and a JPEG encoder 65.

The controller 61 of the host 60 may perform the auto exposure (AE) control, the auto white balance (AWB) control, and the auto focus (AF) control of the camera module. The controller 61 may include the respective engines for performing the auto exposure (AE) control, the auto white balance (AWB) control, and the auto focus (AF) control. The information on the illumination, the color temperature of the light source, and the focus position determined when the controller 61 performs the auto exposure (AE) control, the auto white balance (AWB) control, and the auto focus (AF) control may be stored in a register in the auxiliary memory unit 75. The signal processor 73 determines the appropriate deblurring intensity and denoising intensity depending on the information on the illumination, the color temperature of the light source, and the focus position stored in the register of the auxiliary memory unit 75 and additionally perform the resolution correction calculation of the images.

Referring to FIG. 9, a camera module includes an image sensor 10 and a host 60.

A digital signal processor 317 of the image sensor 10 includes a signal processor 317b and an output interface 317c. The signal processor 317b receives the images provided from the pixel array controller 200, changes formats of the images into formats in which the images are transmitted to the host 60, and transfer the images having the changed formats to the host 60 through the output interface 317c. The images may include the digital signals converted from the analog signals output from the pixel array controller 200 by the digital converter 315.

The auxiliary IC 70 includes an input interface 71, a buffer module 72, a signal processor 73, and an output interface 74, and may further include an auxiliary memory unit 75.

The host 60 includes a controller 61, a color processor 62, a YUV processor 63, a video encoder 64, a JPEG encoder 65, a buffer module 66, a signal processor 67, and an auxiliary memory unit 68.

The buffer module 66 receives the images transferred from the output interface 317c of the digital signal processor 317. The buffer module 66 includes a line buffer memory, and may sequentially store the received images therein.

When a reference number of images are stored in the line buffer memory of the buffer module 66, the signal processor 67 drives a deblurring engine included in the signal processor 67 to perform resolution correction calculation of the images.

The aberration information including the PSFs, the blur parameters, and the deblur parameters are stored in a memory unit 316. As an example, the aberration information is stored in a non-volatile memory such as a ROM of the memory unit 316. The signal processor 67 performs the resolution correction calculation of the images using the aberration information stored in the memory unit 316. The deblurring engine included in the signal processor 67 samples the PSFs stored in the memory unit 316 by a required sampling rate to perform the resolution correction calculation in a video mode.

The controller 61 of the host 60 performs the auto exposure (AE) control, the auto white balance (AWB) control, and the auto focus (AF) control of the camera module. The controller 61 may include the respective engines for performing the auto exposure (AE) control, the auto white balance (AWB) control, and the auto focus (AF) control.

The information on the illumination, the color temperature of the light source, and the focus position determined when the controller 61 performs the auto exposure (AE) control, the auto white balance (AWB) control, and the auto focus (AF) control may be stored in a register in the auxiliary memory unit 68 of the host 60. The signal processor 67 determines the appropriate deblurring intensity and denoising intensity depending on the information on the illumination, the color temperature of the light source, and the focus position stored in the register of the auxiliary memory unit 68 and additionally perform the resolution correction calculation of the images. The images of which the resolutions are corrected are processed by the color processor 62, the YUV processor 63, the video encoder 64, and the JPEG encoder 65.

Cases in which the aberration information is stored in the auxiliary memory unit 317d (see FIG. 7), the auxiliary memory unit 75 (see FIG. 8), and the memory unit 316 (see FIG. 9) are described in the examples of FIGS. 7 through 9 described above. But at least one telephoto lens used in the lens module 40 has a distortion amount relatively greater than that of a wide-angle lens, and distortion coefficients for compensating for the distortion amount of at least one telephoto lens may thus be calculated in a calibration process of processes of manufacturing the camera module and stored in memories. Such memories include the auxiliary memory unit 317d (see FIG. 7), the auxiliary memory unit 75 (see FIG. 8), and the memory unit 316 (see FIG. 9). Here, a logic controller such as the signal processor 317b (see FIG. 7), the signal processor 73 (see FIG. 8), and the signal processor 67 (see FIG. 9) corrects distortion of the images using the distortion coefficients stored in the memories.

Figure 10:
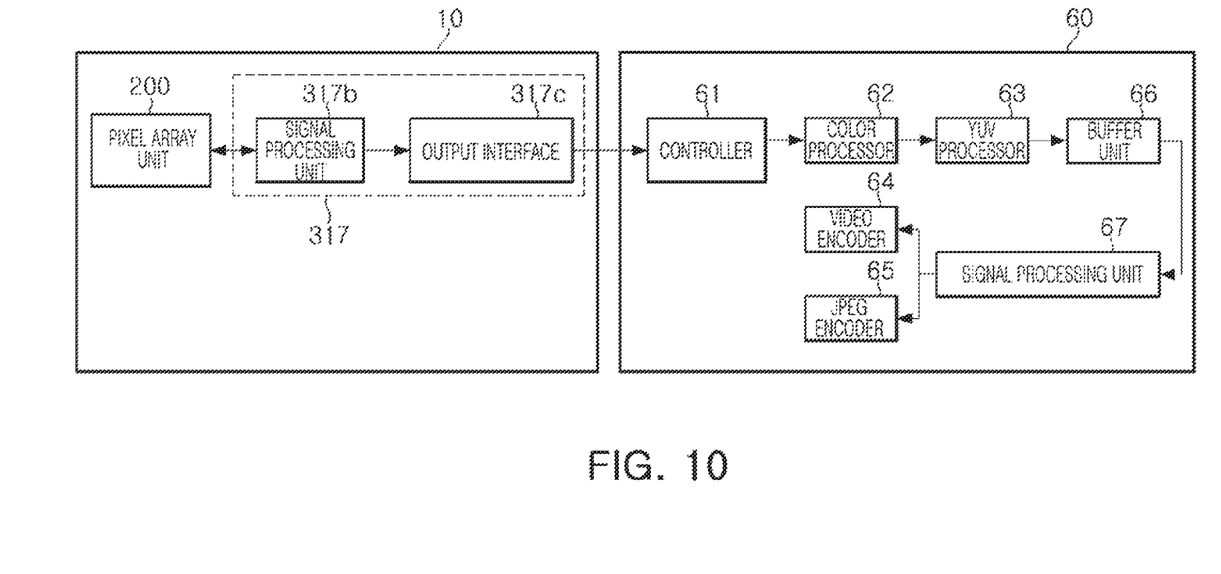
FIG. 10 is a block diagram illustrating an example of main units of an electronic device.

FIG. 10 is a block diagram illustrating main units of an electronic device according to an example in the present disclosure.

A digital signal processor 317 of the image sensor 10 includes a signal processor 317b and an output interface 317c. The signal processor 317b receives the images provided from the pixel array controller 200, change formats of the images into formats in which the images may be transmitted to the host 60, and transfer the images having the changed formats to the host 60 through the output interface 317c. The images includes the digital signals converted from the analog signals output from the pixel array controller 200 by the digital converter 315.

The host 60 includes a controller 61, a color processor 62, a YUV processor 63, a video encoder 64, a JPEG encoder 65, a buffer module 66, and a signal processor 67.

The controller 61 performs an auto exposure (AE) control, an auto white balance (AWB) control, and an auto focus (AF) control of the camera module. The controller 61 may include the respective engines for performing the auto exposure (AE) control, the auto white balance (AWB) control, and the auto focus (AF) control.

The images transferred through the output interface 317c are processed by the color processor 62 and the YUV processor 63 and then transferred to the buffer module 66. The buffer module 66 may include a line buffer memory, and may sequentially store the received images therein.

When a reference number of images are stored in the line buffer memory of the buffer module 66, the signal processor 67 performs resolution correction calculation of the images. The signal processor 67 determines a zoom region depending on an optical zoom magnification selected by a user, and crop the zoom region in each of a plurality of images stored in the buffer module 66. The signal processor 67 performs super resolution synthesis calculation on the plurality of images in which the zoom regions are cropped to perform an optical zoom at a high magnification.

For example, when a resolution of the image sensor 10 is 12M (the number of pixels: 4000*3000) and a zoom magnification selected by the user in a telephoto lens having an optical zoom magnification of 2× is 4, the image sensor 10 outputs images, optically magnified twice, to the host 60. The signal processor 67 crops regions corresponding to a zoom magnification of 4 in the plurality of images stored in the buffer module 66 and then performs super resolution synthesis calculation on the plurality of images in which the zoom regions are cropped to generate four-fold zoom images having super resolution. The images generated by the signal processor 67 may be processed in video and JPEG formats by the video encoder 64 and the JPEG encoder 65, respectively.

As set forth above, according to the examples in the present disclosure, a camera module having a super image-quality resolution by correcting the resolution of the image generated from the light passing through the telephoto lens depending on the aberration information and having a slim form may be provided. In addition, the zoom regions in each of the plurality of images transferred from the image sensor may be cropped, and the plurality of images in which the zoom regions are cropped may be synthesized with one another to perform an optical zoom at a high magnification.

While exemplary embodiments have been shown and described above, it will be apparent to those skilled in the art that modifications and variations could be made without departing from the scope of the present invention as defined by the appended claims.

What is claimed is:

1. A camera module device, comprising:
    a lens module comprising a lens;
    an image sensor disposed below the lens module and configured to generate an image of a subject from light passing through the lens; and
    a logic controller configured to estimate aberration information by comparing the generated image with a pre-constructed clear image of the subject, and perform a resolution correction calculation on the image using the estimated aberration information,
    wherein the aberration information comprises a point spread function modeled by Blur_Image=PSF*Clear_Image,
    where Blur_Image is the image generated by the image sensor, PSF is the point spread function, Clear_Image is the pre-constructed clear image of the subject, and * is a convolution.

2. The camera module of claim 1, wherein the aberration information comprises a blur parameter including a coordinate position of a peak and a width of blur extracted from the point spread function.

3. The camera module of claim 2, wherein the aberration information comprises:
    point spread functions of error regions in which differences between the point spread functions and a reference point spread function are equal or greater than a threshold value among regions of the image; and
    blur parameters of normal regions in which differences between point spread functions and the reference point spread function are lower than the threshold value among the regions of the image, in a comparison of point spread functions of each of the regions and the reference point spread function.

4. The camera module of claim 3, wherein the reference point spread function is based on design data of the camera module.

5. The camera module of claim 3, further comprising a memory configured to store the point spread functions of the error regions and the blur parameters of the normal regions therein.

6. The camera module of claim 5, wherein respective data sizes of the point spread functions of the error regions and the blur parameters of the normal regions are different from each other.

7. The camera module of claim 5, wherein the memory is a non-volatile memory.

8. The camera module of claim 1, wherein the logic controller performs the resolution correction calculation on the image generated by the image sensor depending on either one or both of an illumination environment at the time of capturing an image of the subject and a focus position.

9. The camera module of claim 3, wherein the aberration information comprises a deblur parameter including information on a number and sizes of the regions.

10. The camera module of claim 1, wherein the lens is curved.

* * * * *